(12) United States Patent
Lee et al.

(10) Patent No.: US 12,211,175 B2
(45) Date of Patent: Jan. 28, 2025

(54) IMAGE SIGNAL PROCESSOR, OPERATING METHOD OF THE IMAGE SIGNAL PROCESSOR, AND APPLICATION PROCESSOR INCLUDING THE IMAGE SIGNAL PROCESSOR

(71) Applicant: SAMSUNG ELECTRONICS CO., LTD., Suwon-si (KR)

(72) Inventors: Joohyun Lee, Suwon-si (KR); Ildo Kim, Suwon-si (KR); Dusic Yoo, Suwon-si (KR); Sukhwan Lim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 285 days.

(21) Appl. No.: 17/970,272

(22) Filed: Oct. 20, 2022

(65) Prior Publication Data
US 2023/0153948 A1    May 18, 2023

(30) Foreign Application Priority Data

Nov. 12, 2021    (KR) .................. 10-2021-0156060
May 9, 2022     (KR) .................. 10-2022-0056873

(51) Int. Cl.
*G06T 5/00*    (2024.01)
*G06T 3/40*    (2024.01)

(52) U.S. Cl.
CPC .............. *G06T 5/00* (2013.01); *G06T 3/40* (2013.01); *G06T 2207/10024* (2013.01)

(58) Field of Classification Search
CPC ... G06T 5/00; G06T 3/40; G06T 2207/10024; H04N 23/81

USPC ........................................ 348/222.1
See application file for complete search history.

(56) References Cited

U.S. PATENT DOCUMENTS

| | | |
|---|---|---|
| 8,284,308 B2 | 10/2012 | Nakagawa et al. |
| 8,471,928 B2 | 6/2013 | Yoo et al. |
| 9,756,266 B2 | 9/2017 | Mills et al. |
| 9,875,524 B2 | 1/2018 | Tatsumi |
| 9,986,890 B2 | 6/2018 | Miyai |
| 10,593,019 B2 | 3/2020 | Jain et al. |

(Continued)

FOREIGN PATENT DOCUMENTS

KR    10-2016-0045613 A    4/2016

*Primary Examiner* — Joel W Fosselman
(74) *Attorney, Agent, or Firm* — Sughrue Mion, PLLC

(57) ABSTRACT

Provided are an image signal processor, an operating method of the image signal processor, and an application processor including the image signal processor. The image signal processor includes a downscaling circuit configured to generate a first image signal by downscaling an input image signal; an image processing engine configured to generate a second image signal by performing a plurality of image processing operations on the first image signal; a first upscaling circuit configured to generate a third image signal by upscaling the second image signal; a second upscaling circuit configured to generate a fourth image signal by upscaling the first image signal; a correction information generating circuit configured to generate an image information signal by extracting information on image quality loss of the third image signal from the input image signal and the fourth image signal; and a recomposition circuit configured to generate an output image signal by recomposing the third image signal and the image information signal.

20 Claims, 18 Drawing Sheets

(56) References Cited

U.S. PATENT DOCUMENTS

| | | |
|---|---|---|
| 10,949,950 B2 | 3/2021 | Jiang et al. |
| 2011/0317045 A1* | 12/2011 | Vakrat .................... H04N 25/60 348/E9.037 |
| 2014/0093182 A1 | 4/2014 | Arai |
| 2022/0172322 A1* | 6/2022 | Prins .................... G06T 11/001 |

* cited by examiner

IMAGE SIGNAL PROCESSOR, OPERATING METHOD OF THE IMAGE SIGNAL PROCESSOR, AND APPLICATION PROCESSOR INCLUDING THE IMAGE SIGNAL PROCESSOR

CROSS-REFERENCE TO RELATED APPLICATIONS

This application is based on and claims priority under 35 U.S.C. § 119 to Korean Patent Application No. 10-2021-0156060, filed on Nov. 12, 2021, and Korean Patent Application No. 10-2022-0056873, filed on May 9, 2022, in the Korean Intellectual Property Office, the disclosures of which are incorporated by reference herein in their entireties.

BACKGROUND

The present disclosure relates to image signal processing, and more particularly, to an image signal processor that image-processes raw image data received from an image sensor: an operating method of the image signal processor, and an application processor including the image signal processor.

An image signal processor provided in an imaging device such as a camera or a smart phone may image-process raw image provided from an image sensor to generate a converted image, such as an RGB image or a YUV image. The converted image may be compressed based on compression techniques such as Joint Photographic Experts Group (JPEG), Moving Picture Experts Group (MPEG), H.264, and stored in a storage device or displayed on a display device. The image signal processor processes an image signal received from the outside according to various image processing processes. According to technological advances in image signal processors, the addition and expansion of various functions have been continuously considered, and to this end, the power and data band-width required for image signal processors have increased.

SUMMARY

Provided are an image signal processor that performs image processing that minimizes power consumption and data band-width while minimizing deterioration in image quality of an input image signal, a method of operating the image signal processor, and an application processor including the image signal processor.

According to an aspect of an example embodiment, an image signal processor includes: a downscaling circuit configured to generate a first image signal by downscaling an input image signal: an image processing engine configured to generate a second image signal by performing a plurality of image processing operations on the first image signal: a first upscaling circuit configured to generate a third image signal by upscaling the second image signal: a second upscaling circuit configured to generate a fourth image signal by upscaling the first image signal: a correction information generating circuit configured to generate an image information signal by extracting information on image quality loss of the third image signal from the input image signal and the fourth image signal; and a recomposition circuit configured to generate an output image signal by recomposing the third image signal and the image information signal.

According to an aspect of an example embodiment, an operating method of an image signal processor configured to image process an input image signal, includes: generating a first image signal by downscaling the input image signal: generating a second image signal by image processing the first image signal: generating a third image signal by upscaling the second image signal: generating a fourth image signal by upscaling the first image signal; generating an image information signal by extracting information on image quality loss of the third image signal from the input image signal and the fourth image signal; and generating an output image signal by recomposing the third image signal and the image information signal.

According to an aspect of an example embodiment, an application processor includes: a decomposition circuit configured to generate a first image signal including a low-frequency component of an input image signal and an image information signal including a high-frequency signal, based on the input image signal: an image processing engine configured to generate a second image signal by performing a plurality of image processing operations on the first image signal: an image signal processor including a recomposition circuit configured to recompose the second image signal and the image information signal to generate an output image signal; and a memory configured to store the image information signal and transmit the image information signal to the recomposition circuit.

BRIEF DESCRIPTION OF THE DRAWINGS

The above and/or other aspects will be more clearly understood from the following detailed description taken in conjunction with the accompanying drawings in which.

DETAILED DESCRIPTION

Hereinafter, example embodiments will be described in detail with reference to the accompanying drawings.

Figure 1:
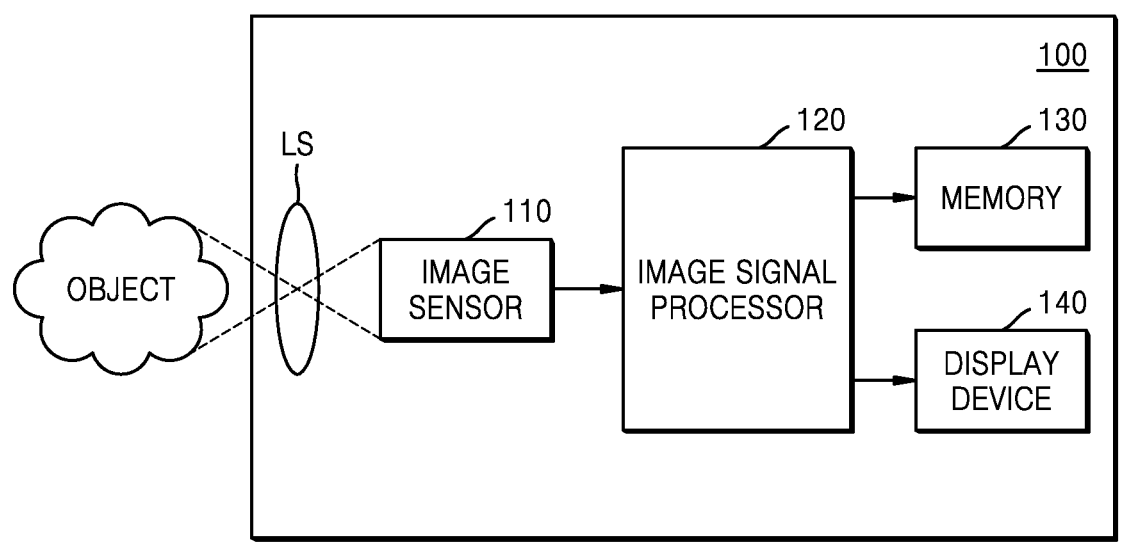
FIG. 1 is a block diagram illustrating an image processing system according to an example embodiment.

FIG. 1 is a block diagram illustrating an image processing system 100 according to an example embodiment.

The image processing system 100 may be included in an electronic device or implemented as a separate electronic device. The electronic device may be, for example, a personal computer (PC), an Internet of Things (IoT) device, or a portable electronic device. The portable electronic device may be a laptop computer, a mobile phone, a smart phone, a tablet PC, a personal digital assistant (PDA), an enterprise digital assistant (EDA), a digital still camera, a digital video camera, an audio device, a portable multimedia player (PMP), a personal navigation device (PND), an MP3 player, a handheld game console, an e-book, a wearable device, or the like.

Referring to FIG. 1, the image processing system 100 may include an image sensor 110, an image signal processor 120, a memory 130, and a display device 140.

The image sensor 110 may convert an optical signal of the subject OBJECT incident through the optical lens LS into an electrical signal or an image (i.e., image data). The image sensor 110 may include, for example, a pixel array including a plurality of two-dimensionally arranged sensing pixels and a sensing circuit, and the pixel array and the sensing circuit may be integrated into one semiconductor chip. The pixel array may convert received optical signals into electrical signals. The pixel array, for example, may be implemented with a photoelectric conversion element such as a charge coupled device (CCD) or a complementary metal oxide semiconductor (CMOS), and may be implemented with various types of photoelectric conversion devices. The sensing circuit may convert an electrical signal provided from the pixel array into an image, and generate the converted image as the input image signal IIMG. The input image signal IIMG may be an input to the image signal processor 120 in the following description.

The image signal processor 120 may image-process the input image signal IIMG provided from the image sensor 110 to generate an output image signal OIMG. For example, the image signal processor 120 may image-process the input image signal IIMG based on set scaling, white balance, various parameters, and the like. The output image signal OIMG may be a color space image such as an RGB image or a YUV image. A size, for example, a resolution, of the output image signal OIMG may be the same as that of the input image signal IIMG. The output image signal OIMG may be stored in the memory 130. The memory 130 may be a volatile memory such as a dynamic random access memory (DRAM) or a static RAM (SRAM), or a non-volatile memory such as a phase change RAM (PRAM), a resistive RAM (ReRAM), or a flash memory. The output image signal OIMG stored in the memory 130 may be later used in the image processing system 100 or stored in a storage device.

Also, the image signal processor 120 may generate a scaled image by decreasing or increasing the size of the output image signal OIMG. For example, the image signal processor 120 may generate the scaled image by scaling the size, that is, the resolution of the converted image to match the resolution of the display device 140. The image signal processor 120 may provide the scaled image to the display device 140.

Power consumed by the image signal processor 120 for image processing and data band-width increase according to the high-pixel tendency for manufacturing the image sensor 110. Therefore, to address these problems, a method of reducing the size, i.e., resolution, of the input image signal IIMG before image processing may be used. However, when the amount of data of the input image signal IIMG is reduced to reduce power consumption and data band-width, image quality loss occurs during the scaling process.

To minimize deterioration (loss) of image quality, according to one or more embodiments of the disclosure, the image signal processor 120, the operating method of the image signal processor 120, and the application processor 200 including the image signal processor 120 extract information on image quality deterioration due to scaling and image processing from the input image signal IIMG to generate an image information signal IMG_IF in addition to the process of reducing the data amount of the input image signal IIMG and image processing, and generate the output image signal OIMG by using the image information signal IMG_IF, thereby minimizing deterioration in image quality of the output image signal OIMG. Accordingly, in the final image processing of the high-definition input image signal IIMG, it is possible to minimize power consumption and data band-width while minimizing image quality degradation.

Figure 2:
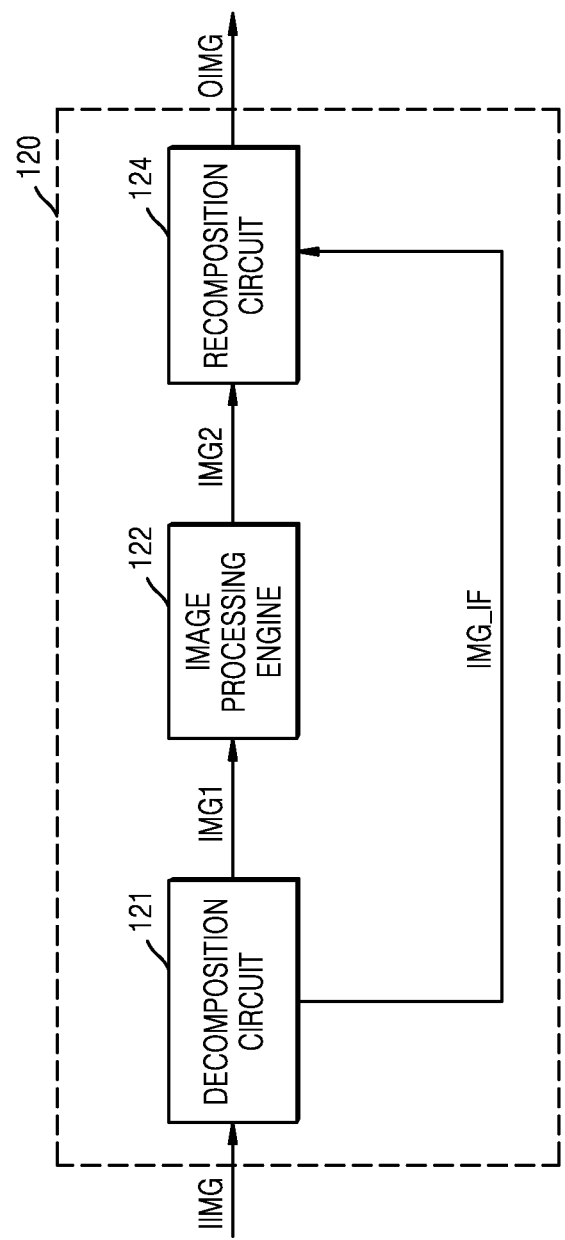
FIG. 2 is a diagram schematically illustrating an image signal processor according to an example embodiment.

FIG. 2 is a diagram schematically illustrating an image signal processor 120 according to an example embodiment.

The image signal processor 120 of FIG. 2 may include a decomposition circuit 121, an image processing engine 122, and a recomposition circuit 124.

Referring to FIG. 2, the decomposition circuit 121 may generate a first image signal IMG1 and an image information signal IMG_IF by downscaling the input image signal IIMG and/or generating correction information. For example, the first image signal IMG1 may be a down-scaled signal of the input image signal IIMG. Accordingly, the data amount of the first image signal IMG1 may be less than the data amount of the input image signal IIMG. Alternatively, the decomposition circuit 121 may divide the input image signal IIMG for each frequency band, and generate the first image signal IMG1 having a low frequency component by applying a low pass filter. Similarly, the data amount of the first image signal IMG1 may be less than that of the input image signal IIMG. The image information signal IMG_IF may be generated by extracting a high frequency component of the input image signal IIMG. The high-frequency component may be correction information capable of correcting image quality deterioration due to scaling and image processing.

The image processing engine 122 may receive the first image signal IMG1 and perform various image processing on the first image signal IMG1 to generate the second image signal IMG2. The image processing engine 122 may include a plurality of image modules with high power consumption and high computational amount.

As described above, before image processing is performed by the image processing engine 122, the decomposition circuit 121 generates the first image signal IMG1 having a data amount smaller than that of the input image signal IIMG. In addition, by image processing the first image signal IMG1 in the image processing engine 122, power consumption and the amount of calculation in the image processing engine 122 may be reduced.

The recomposition circuit 124 may recompose the second image signal IMG2 and the image information signal IMG_IF output from the image processing engine 122 to generate the output image signal OIMG. By reconstructing the second image signal IMG2 and the image information signal IMG_IF, image quality deterioration may be minimized. As described above, the image information signal IMG_IF may be a high frequency signal. For example, the image information signal IMG_IF may include information related to an edge of the input image signal IIMG.

Figure 3:
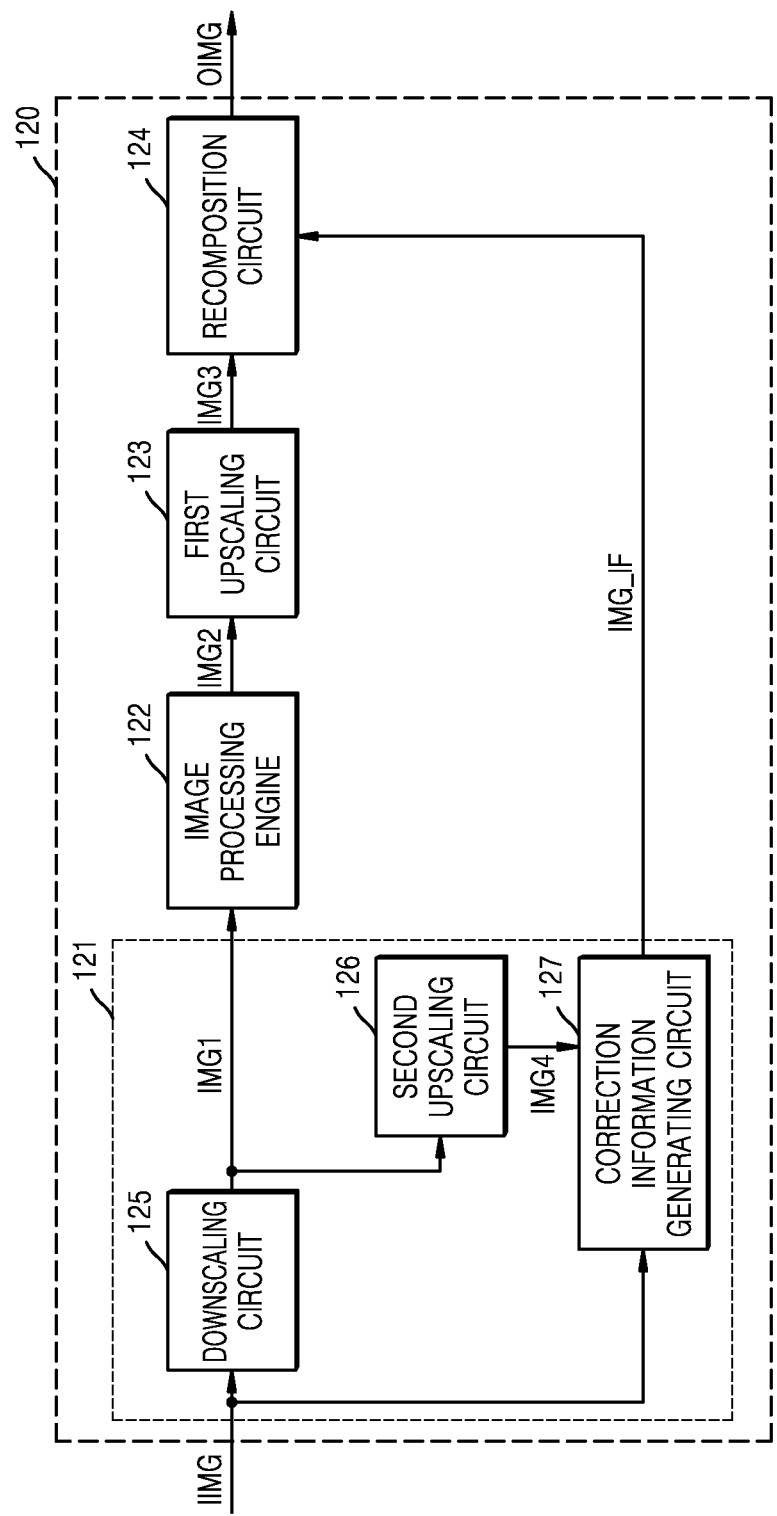
FIG. 3 is a diagram schematically illustrating an image signal processor according to an example embodiment.

FIG. 3 is a block diagram schematically illustrating an image signal processor according to an example embodiment.

Referring to FIG. 3, the image signal processor 120 may include a decomposition circuit 121, an image processing engine 122, a first upscaling circuit 123, and a recomposition circuit 124.

The decomposition circuit 121 of the image signal processor 120 may include a downscaling circuit 125, a second upscaling circuit 126, and a correction information generating circuit 127. Although the second upscaling circuit 126 and the correction information generating circuit 127 are illustrated as separate components in FIG. 3, embodiments are not limited thereto, and in another example embodiment, the second upscaling circuit 126 may be included in the correction information generating circuit 127. In addition, although the recomposition circuit 124 and the first upscaling circuit 123 are illustrated as separate components in FIG. 3, embodiments are not limited thereto, and the first upscaling circuit 123 may be included in the recomposition circuit 124.

In an example embodiment, the downscaling circuit 125, the image processing engine 122, the recomposition circuit 124, the first upscaling circuit 123, the second upscaling circuit 126, and the correction information generating circuit 127 may be implemented as hardware. However, embodiments are not limited thereto, and the downscaling circuit 125, the image processing engine 122, the recomposition circuit 124, the first upscaling circuit 123, the second upscaling circuit 126, and the correction information generating circuit 127 may be implemented by a combination of hardware and software.

The input image signal IIMG may be input to the downscaling circuit 125 and the correction information generating circuit 127. The downscaling circuit 125 may generate the first image signal IMG1 by downscaling the input image signal IIMG. Accordingly, the resolution of the first image signal IMG1 may be less than the resolution of the input image signal IIMG. For example, the resolution of the first image signal IMG1 may be 640×480, and the resolution of the input image signal IIMG may be 800×600. As another example, the downscaling circuit 125 may include a low pass filter through which the first image signal IMG1 having a low frequency component of the input image signal IIMG may be generated.

When the resolution of the input image signal IIMG is reduced through the downscaling circuit 125, since the power consumption and the band-width gain are the largest, a low pass filter through scaling has been described as an example embodiment, but embodiments may be implemented by a low-pass filter capable of implementing a method other than scaling (e.g., a method of reducing a data amount other than downscaling).

The first image signal IMG1 may be input to the image processing engine 122 and the second upscaling circuit 126. The second upscaling circuit 126 may generate the fourth image signal IMG4 by upscaling the first image signal IMG1. The resolution of the fourth image signal IMG4 may be the same as the resolution of the input image signal IIMG. For example, the resolution of the fourth image signal IMG4 and the resolution of the input image signal IIMG may be 800×600.

The fourth image signal IMG4 and the input image signal IIMG may be input to the correction information generating circuit 127. The correction information generating circuit 127 may extract correction information related to image quality deterioration caused by scaling and image processing in the image processing engine 122 from the fourth image signal IMG4 and the input image signal IIMG to generate an image information signal IMG_IF. The image information signal IMG_IF may be a high frequency signal. For example, the image information signal IMG_IF including information for compensating for loss due to image processing and scaling in the image processing engine 122 may be a signal including high frequency information related to an edge of the input image signal IIMG. That is, since the image information signal IMG_IF includes information related to image quality degradation that occurs while the input image signal IIMG undergoes scaling and image processing, the recomposition circuit 124 may use the image information signal IMG_IF to minimize deterioration in image quality of the output image signal OIMG.

The image processing engine 122 may perform various image processing on the first image signal IMG1 to generate the second image signal IMG2. Since image quality may be deteriorated during the image processing process, the second image signal IMG2 may be an image signal with deteriorated image quality.

The first upscaling circuit 123 may generate the third image signal IMG3 by upscaling the second image signal IMG2. Accordingly, the resolution of the input image signal IIMG and the third image signal IMG3 may be the same. For example, the resolution of the input image signal IIMG and the resolution of the third image signal IMG3 may be 800×600. Also in this process, image quality deterioration due to scaling may occur. Accordingly, the third image signal IMG3 may be an image signal whose image quality is degraded by image processing and scaling, and the third image signal IMG3 may have a lower image quality than the input image signal IIMG.

The recomposition circuit 124 may reconstruct the third image signal IMG3 and the image information signal IMG_IF to generate the output image signal OIMG. As described above, the third image signal IMG3 may be an image signal with reduced image quality, and the recomposition circuit may perform correction to minimize deterioration in image quality of the third image signal IMG3 through correction information extracted from the input image signal IIMG and the fourth image signal IMG4 included in the image information signal IMG_IF.

The output image signal OIMG may be scaled again to fit the resolution of the display device 140 such as an electronic device including the image signal processor 120.

Figure 4:
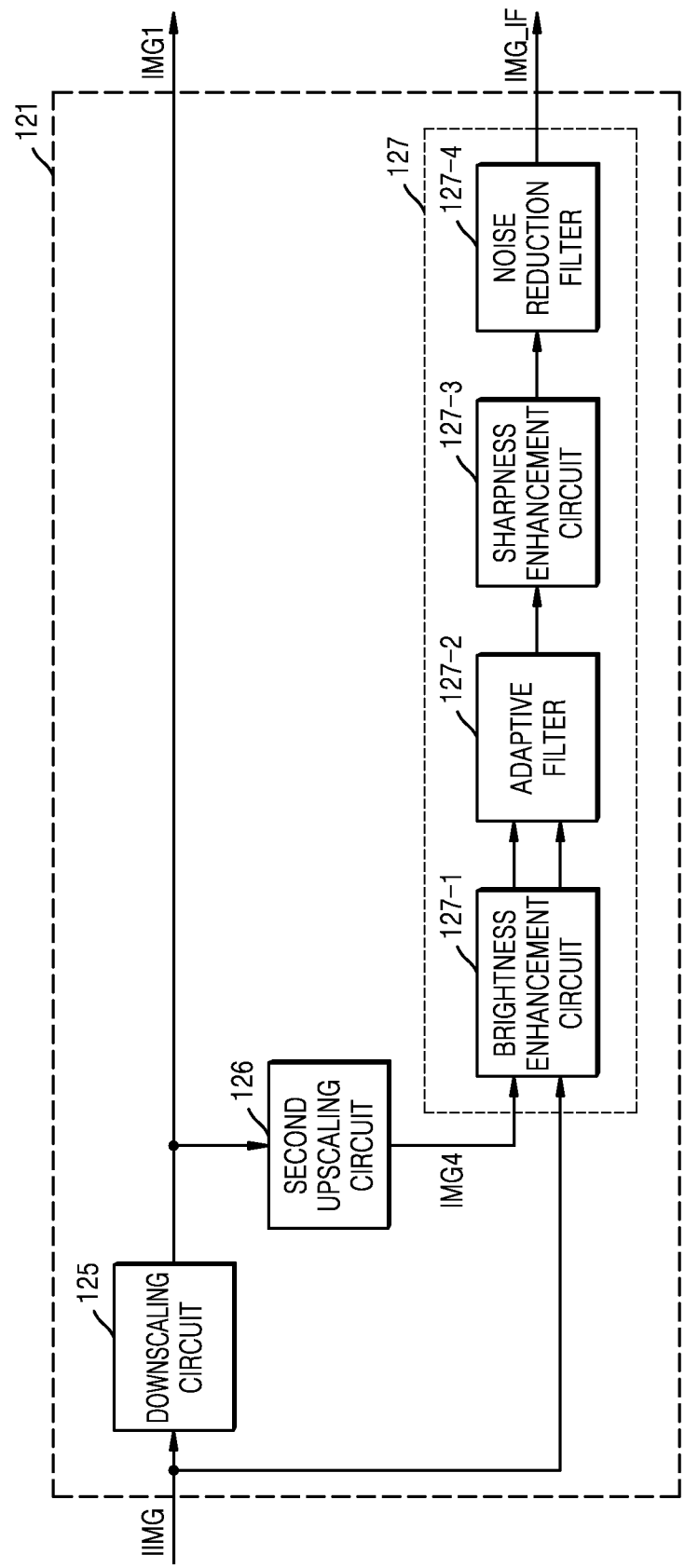
FIG. 4 is a block diagram schematically illustrating a decomposition circuit of an image signal processor according to an example embodiment.

FIG. 4 is a block diagram schematically illustrating a decomposition circuit of an image signal processor according to an example embodiment.

Referring to FIG. 4, the decomposition circuit 121 may include a downscaling circuit 125, a second upscaling circuit 126, and a correction information generating circuit 127, and the correction information generating circuit 127 may include at least one of an adaptive filter 127-2, a noise reduction filter 127-4, a brightness enhancement circuit 127-1, and a sharpness enhancement circuit 127-3.

The input image signal IIMG and the fourth image signal IMG4 may pass through the brightness enhancement circuit 127-1 and the adaptive filter 127-2, and the adaptive filter 127-2 may filter the input image signal IIMG and the fourth image signal IMG4 that have passed through the brightness enhancement circuit 127-1 to generate one image signal, but embodiments are not limited thereto.

As described above, the correction information generating circuit 127 generates the image information signal IMG_IF by performing the correction information generating process to extract as much as possible information related to image quality degradation of the input image signal IIMG that occurs in image processing and scaling. In the process of generating the correction information, deterioration of image quality that may occur in the process of scaling and image processing may be mainly related to luminance and/or sharpness. Accordingly, in various embodiments, the correction information generating circuit 127 may include a brightness enhancement circuit 127-1 and/or a sharp enhancement circuit 127-3.

Figure 5:
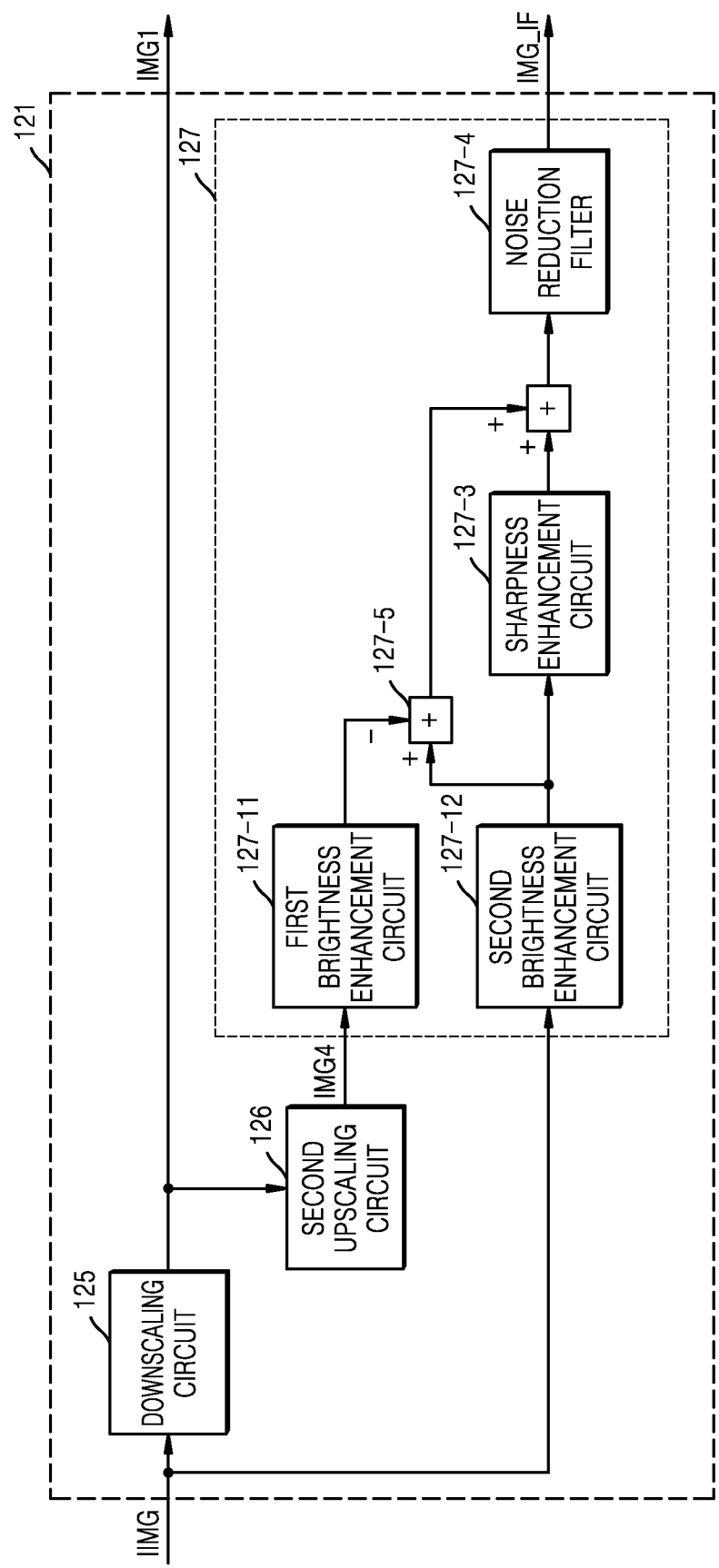
FIG. 5 is a block diagram schematically illustrating a decomposition circuit of an image signal processor according to an example embodiment.

FIG. 5 is a block diagram schematically illustrating a decomposition circuit of an image signal processor according to an example embodiment.

Referring to FIG. 5, the decomposition circuit 121 may include a downscaling circuit 125, a second upscaling circuit 126, and a correction information generating circuit 127. The correction information generating circuit 127 may include a first brightness enhancement circuit 127-11, a second brightness enhancement circuit 127-12, and a differential circuit 127-5.

FIG. 5 is one example embodiment in which the image information signal IMG_IF is generated by extracting information on image quality deterioration of the third image signal IMG3 by image processing and scaling from the input image signal IIMG and the fourth image signal IMG4. The differential circuit 127-5 may differentiate the input image signal IIMG and the fourth image signal IMG4 that have respectively passed through the first brightness enhancement circuit 127-11 and the second brightness enhancement circuit 127-12, and a signal obtained by differentiating the input image signal IIMG and the fourth image signal IMG4 that have respectively passed through the first brightness enhancement circuit 127-11 and the second brightness enhancement circuit 127-12 may be combined with the input image signal IIMG that has passed through the sharp enhancement circuit 127-3 and the second brightness enhancement circuit 127-12. Finally, it may pass through the noise reduction filter 127-4, and the correction information generation circuit 127 may generate the image information signal IMG_IF. The image information signal IMG_IF generated by the correction information generating circuit 127 through the above process may be a high frequency signal. For example, the image information signal IMG_IF may be a signal including information related to an edge of the input image signal IIMG.

Figure 6:
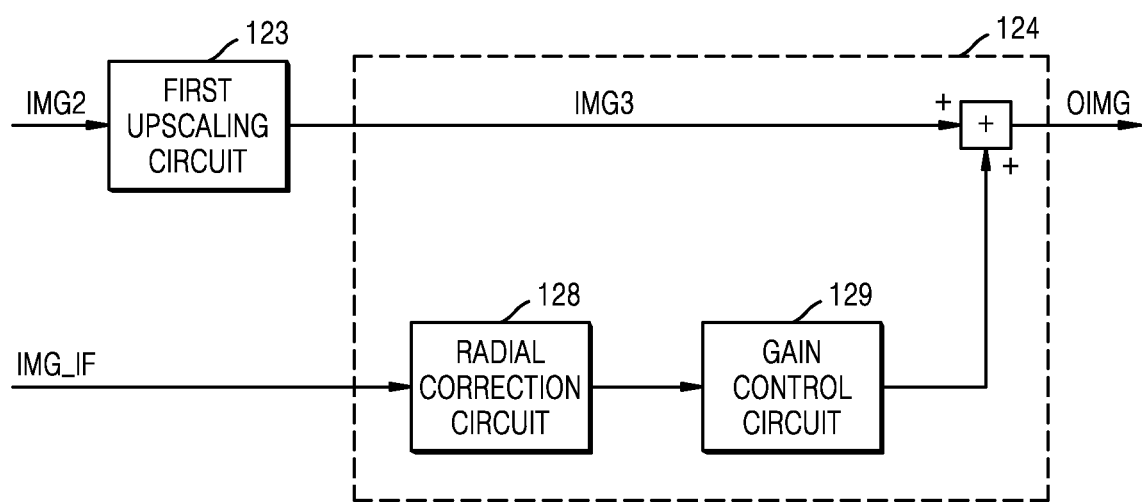
FIG. 6 is a block diagram schematically illustrating a recomposition circuit of an image signal processor according to an example embodiment.

FIG. 6 is a block diagram schematically illustrating a recomposition circuit of an image signal processor according to an example embodiment.

Referring to FIG. 6, the image information signal IMG_IF generated by the correction information generating circuit 127 is input to the recomposition circuit 124. The recomposition circuit 124 may include at least one of a radial correction circuit 128 and a gain control circuit 129.

The recomposition circuit 124 may serve to correct the image information signal IMG_IF, and the radial correction circuit 128 and the gain control circuit 129 may be implemented as hardware.

The recomposition circuit 124 may reconstruct the image information signal IMG_IF and the third image signal IMG3 to generate the output image signal OIMG. The recomposition circuit 124 may perform at least one function of a radial correction and a gain control on the image information signal IMG_IF to minimize the deterioration of the image quality of the output image signal OIMG.

The image may have more noise from the center to the periphery due to the characteristics of the lens. To adjust for such noise, the recomposition circuit 124 may include a radial correction circuit 128. In addition, the intensity of the image information signal IMF IF may be adjusted to minimize deterioration of image quality of the third image signal IMG3 through the gain control circuit 129.

Referring to FIG. 6, the recomposition circuit 124 is shown as a separate configuration from the first upscaling circuit 123 but it will be understand that the first upscaling circuit 123 may be included in the recomposition circuit 124. Even when the recomposition circuit 124 includes the first upscaling circuit 123, the first upscaling circuit 123 may up-scale the second image signal IMG2 to generate the third image signal IMG3.

Figure 7:
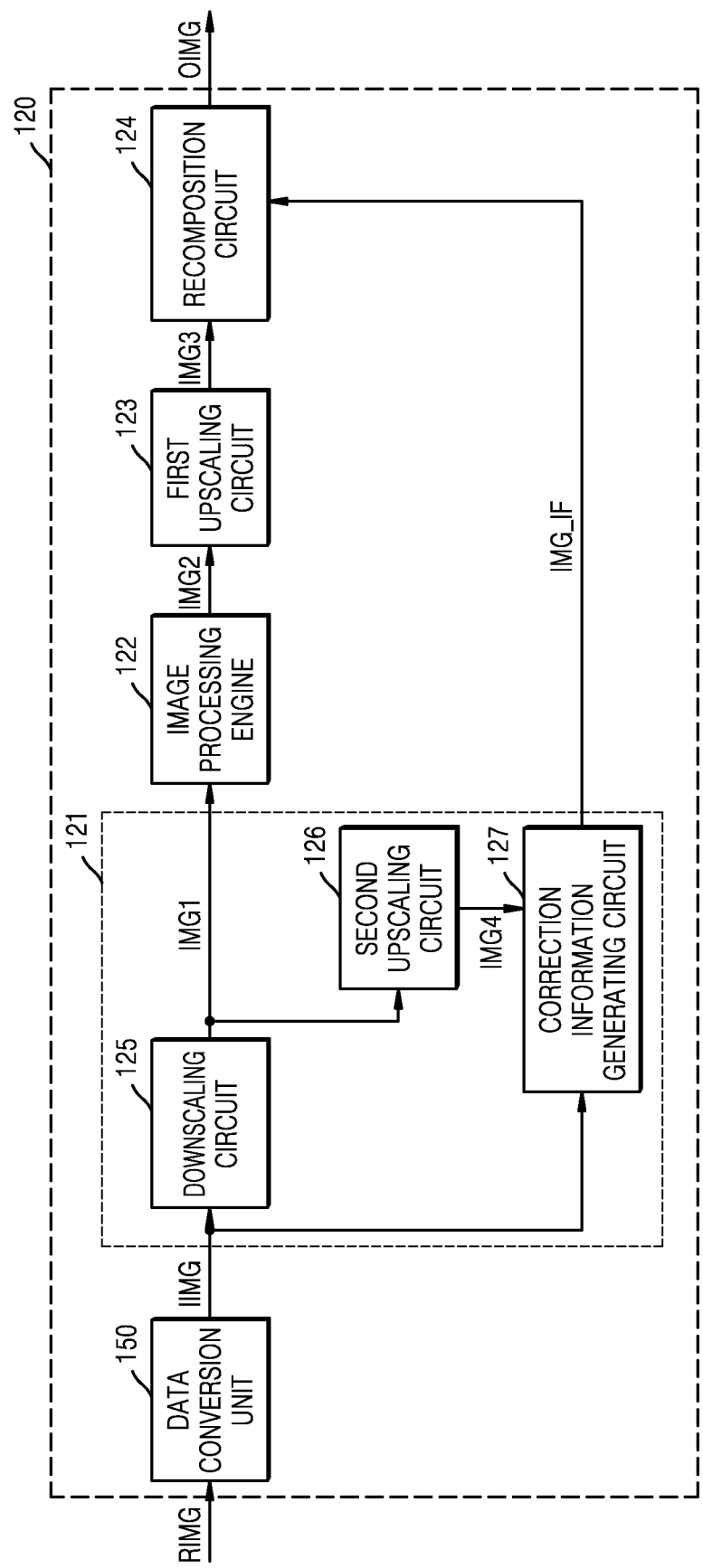
FIG. 7 is a block diagram schematically illustrating an image signal processor according to an example embodiment.

FIG. 7 is a block diagram schematically illustrating an image signal processor according to an example embodiment.

Referring to FIG. 7, the image signal processor 120 may include a decomposition circuit 121, an image processing engine 122, a first upscaling circuit 123, a recomposition circuit 124, and a data conversion unit 150.

The data conversion unit 150 may data-convert the raw image signal RIMG generated by the image sensor 110 to generate the input image signal IIMG. The resolution of the input image signal IIMG and the resolution of the raw image signal RIMG may be the same by the data conversion unit 150, and the data amount of the input image signal IIMG may be greater than the data amount of the raw image signal RIMG. Alternatively, the color space of the raw image signal RIMG and the input image signal IIMG may be different due to data conversion of the data conversion unit 150. For example, the raw image signal RIMG may have a Bayer pattern, and the input image signal IIMG may have an RGB or YUV pattern. Converting a Bayer pattern to an RGB pattern may increase the amount of data.

Figure 8A:
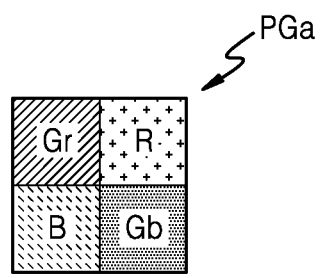
FIGS. 8A and 8B show a Bayer pattern of a raw image signal according to an example embodiment.
Figure 8B:
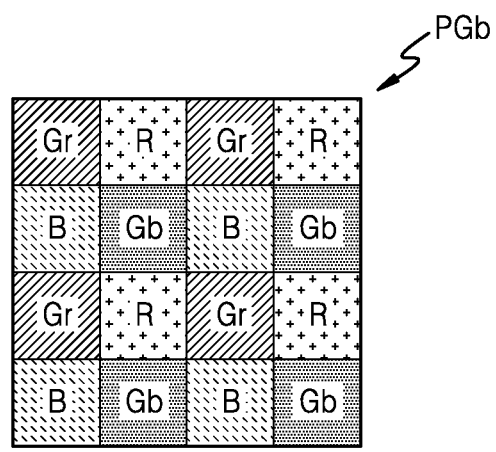

FIGS. 8A and 8B show a Bayer pattern that a raw image signal may have according to an example embodiment.

Referring to FIGS. 8A and 8B, the Bayer pattern may mean a pattern intersectingly arranged such that green is 50% and red and blue are 25%, respectively, according to human visual characteristics.

Referring to FIG. 8A, the pixel group PGa may be configured in a 2×2 Bayer pattern. The pixel group PGa may include a first green pixel Gr, a red pixel R, a second green pixel Gb, and a blue pixel B, and the first green pixel Gr and the second green pixel Gb may be arranged in a diagonal direction, and the red pixel R and the blue pixel B may be arranged in a diagonal direction.

Referring to FIG. 8B, the pixel group PGb may be configured in a 4×4 Bayer pattern. The pixel group PGb may include four first green pixels Gr, red pixels R, second green pixels Gb, and blue pixels B, respectively. In addition to this, the pixel group may be configured with Bayer patterns of various sizes.

Figure 9:
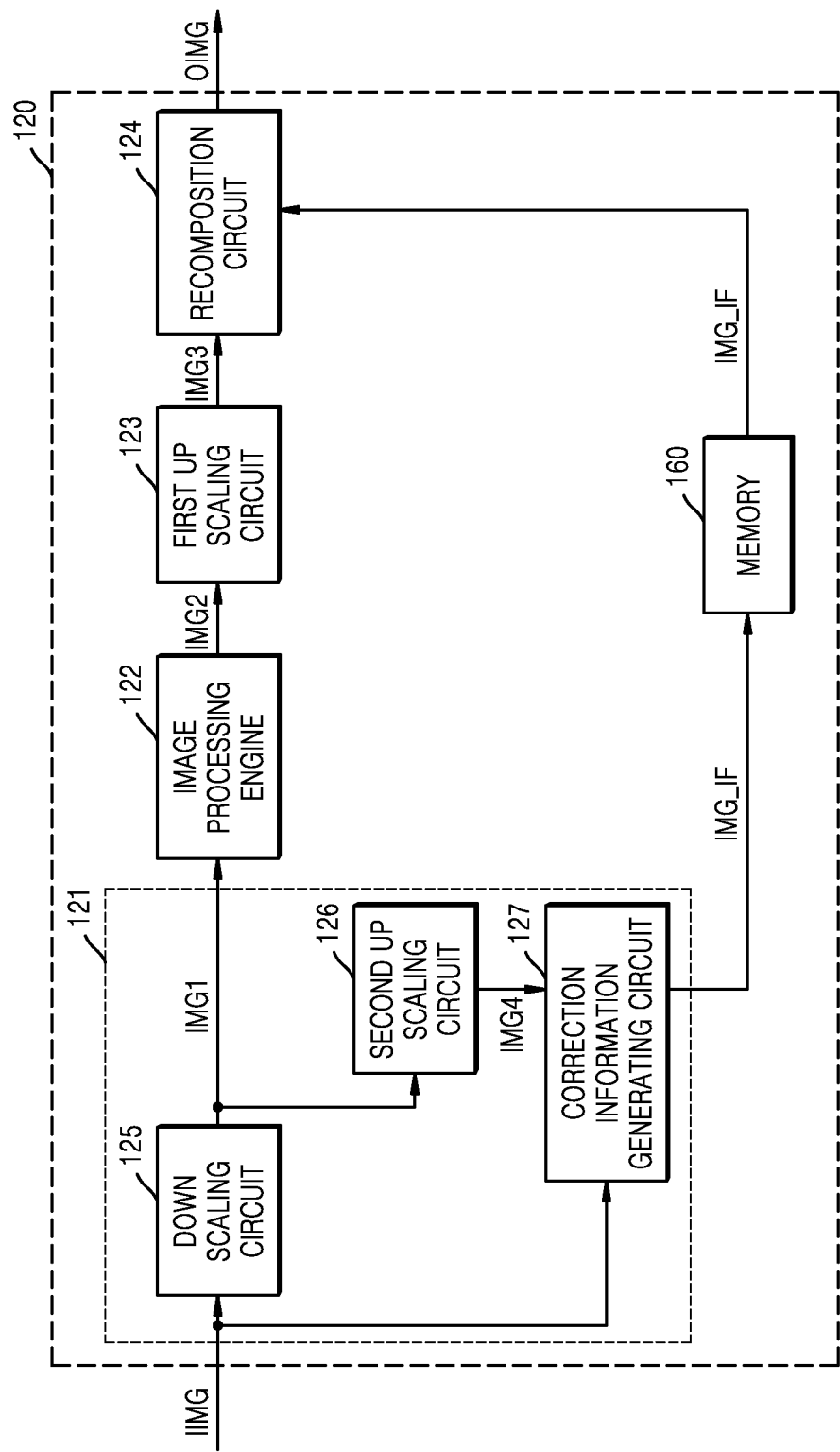
FIG. 9 is a block diagram schematically illustrating an image signal processor according to an example embodiment.

FIG. 9 is a block diagram schematically illustrating an image signal processor according to an example embodiment.

Referring to FIG. 9, the image signal processor 120 may include a decomposition circuit 121, an image processing engine 122, a first upscaling circuit 123, a recomposition circuit 124, and a memory 160.

The decomposition circuit 121 may generate the first image signal IMG1 and the image information signal IMG_IF from the input image signal IIMG. The image information signal IMG_IF generated by the decomposition circuit 121 may be generated after passing through the brightness enhancement circuit 127-1 of the correction information generating circuit 127 that may be included in the decomposition circuit 121.

The image information signal IMG_IF includes correction information for minimizing image quality deterioration caused by image processing and scaling, and may be input to the recomposition circuit 124 together with the third image signal IMG3. As described above, the image information signal IMG_IF may be transmitted directly from the decomposition circuit 121 to the recomposition circuit 124, but as shown in FIG. 9, the image information signal IMG_IF may be stored in the memory 160 inside the image signal processor 120 and then transmitted to the recomposition circuit 124. In this case, the image information signal IMG_IF and the third image signal IMG3 transmitted from the memory 160 may be simultaneously input to the recomposition circuit 124. However, embodiments are not limited thereto, and the image information signal IMG_IF and the third image signal IMG3 may be input to the recomposition circuit 124 at a time interval intended by a user.

For example, the memory 160 may be a volatile memory such as a dynamic random access memory (DRAM) or a static RAM (SRAM), or a non-volatile memory such as a phase change RAM (PRAM), a resistive RAM (ReRAM), or a flash memory.

Figure 10:
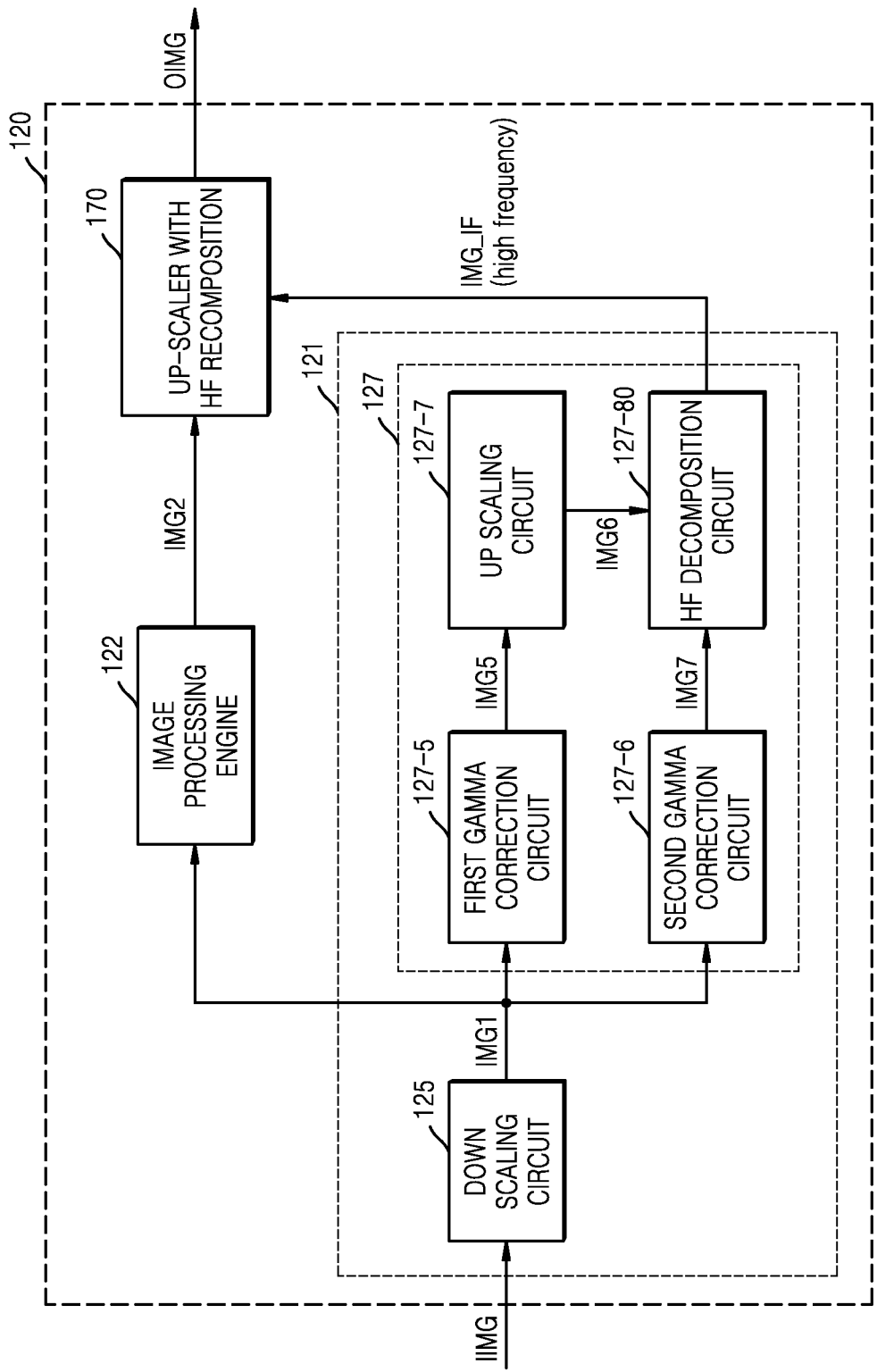
FIG. 10 is a block diagram schematically illustrating an image signal processor according to an example embodiment.
Figure 11:
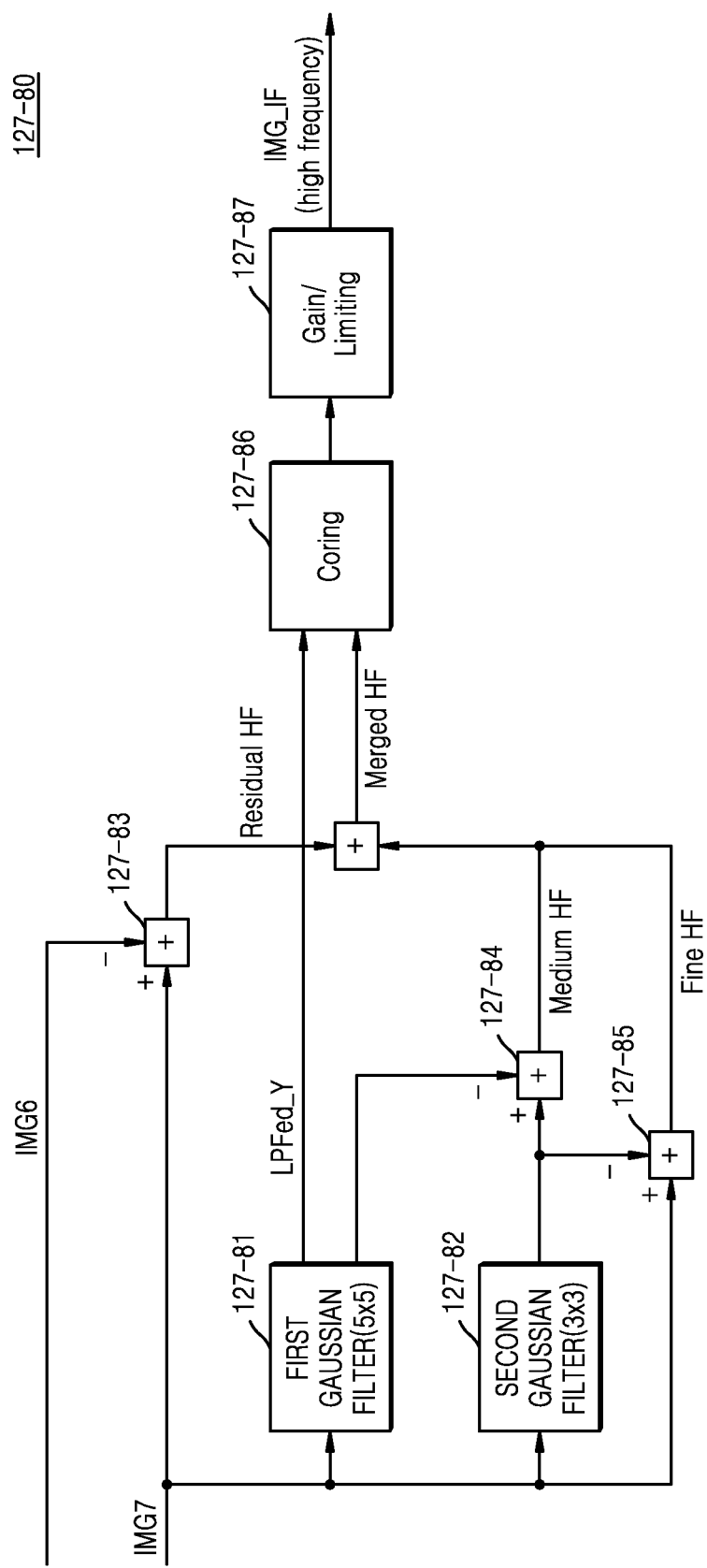
FIG. 11 is a block diagram schematically illustrating an HF decomposition circuit of the image signal processor of FIG. 10.

FIG. 10 is a block diagram schematically showing an image signal processor according to an example embodiment, and FIG. 11 is a block diagram schematically illustrating a high frequency decomposition circuit of the image signal processor of FIG. 10.

Referring to FIG. 10, the image signal processor 120 may include a downscaling circuit 125, a first gamma correction circuit 127-5, a second gamma correction circuit 127-6, an upscaler 127-7, an image processing engine 122, a HF decomposition circuit 127-80, and an up-scaler with HF recomposition 170.

The downscaling circuit 125 may generate the first image signal IMG1 by downscaling the input image signal IIMG. The first image signal IMG1 may be input to each of the image processing engine 122, the first gamma correction circuit 127-5, and the second gamma correction circuit 127-6. The image processing engine 122 generates a second image signal IMG2, the first gamma correction circuit 127-5 generates a fifth image signal IMG5, and the second gamma correction circuit 127-6 generates the seventh image signal IMG7. The upscaler 127-7 may generate the sixth image signal IMG6 by upscaling the fifth image signal IMG5. The high frequency decomposition circuit 127-80 may generate the image information signal IMG_IF by performing Gaussian filtering and differentiation between the sixth image signal IMG6 and the seventh image signal IMG7. The up-scaler with HF recomposition 170 may generate the output image signal OIMG by reconstructing and upscaling the second image signal IMG2 and the image information signal IMG_IF. The resolution of the output image signal OIMG may be the same as the resolution of the input image signal IIMG, and the resolution of the output image signal OIMG may be adjusted after passing through the recomposition circuit 124 to be displayed on the display. The image processing engine 122 may perform image processing desired by the user.

The first gamma correction circuit 127-5 and the second gamma correction circuit 127-6 may serve to correct the overall luminance of the image to alleviate non-linear characteristics of hardware. That is, the first gamma correction circuit 127-5 and the second gamma correction circuit 127-6 may compensate for a loss related to luminance of the first image signal IMG1 that may be caused by downscaling in the downscaling circuit 125.

The resolution of the sixth image signal IMG6 generated by the upscaler 127-7 may be the same as the resolution of the input image signal IIMG.

Referring to FIG. 11, the high frequency decomposition circuit 127-80 may include a first Gaussian filter 127-81, a second Gaussian filter 127-82, and a plurality of differential circuits 127-83, 127-84, and 127-85. The Gaussian filter is a filtering technique that uses a filter mask generated by approximating a Gaussian distribution function, and the Gaussian distribution may have a normal distribution shape, and the Gaussian filter may serve to remove noise. The sizes of the first Gaussian filter 127-81 and the second Gaussian filter 127-82 may be different. For example, the size of the first Gaussian filter 127-81 may be 5×5, and the size of the second Gaussian filter 127-82 may be 3×3.

The HF decomposition circuit 127-80 may generate Medium HF, Fine HF through the differential process of the seventh image signal IMG7 and the seventh image signals IMG7 that have passed through the first Gaussian filter 127-81 and the second Gaussian filter 127-82 as in FIG. 11 by the differential circuits 127-84 and 127-85. Residual HF may be generated by differentiating the sixth image signal IMG6 and the seventh image signal IMG7, and a high-frequency component Merged HF including correction information may be extracted through Fine HF, Medium HF, and Residual HF.

The positions of the upscaler 127-7 and the downscaling circuit 125 may be changed depending on the image signal processor 120, an operating method of the image signal processor 120, and a design in the application processor 200, and the position of the downscaling circuit 125 may also be changed.

Figure 12:
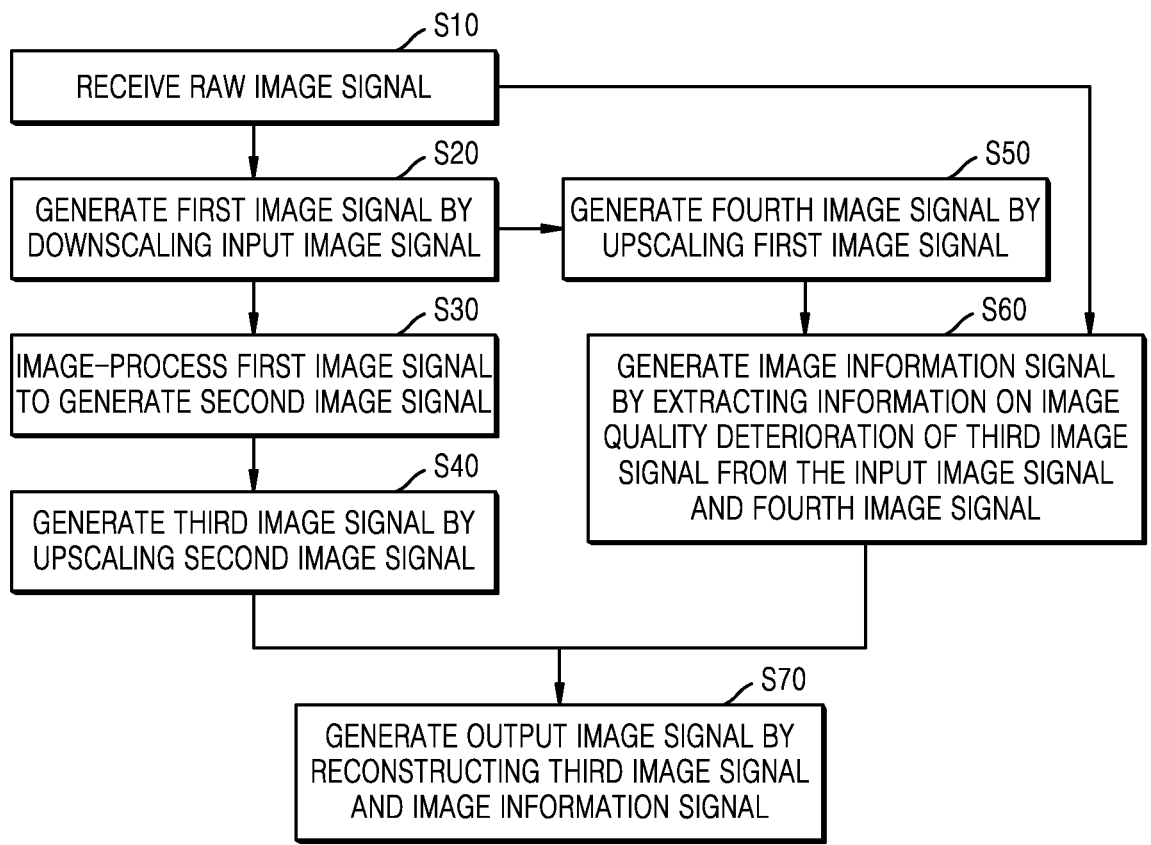
FIG. 12 is a flowchart illustrating an operating method of an image signal processor according to an example embodiment.

FIG. 12 is a flowchart illustrating a method of operating an image signal processor according to an example embodiment.

Referring to FIG. 12, the image signal processor 120 of FIG. 1 may receive an input image signal IIMG (S10). For example, the image sensor 110 of FIG. 1 may generate an input image signal IIMG, and the input image signal IIMG may be input to the image signal processor 120.

The image signal processor 120 may generate the first image signal IMG1 by downscaling the input image signal IIMG (S20). For example, as a result of downscaling the input image signal IIMG, the data amount of the first image signal IMG1 may be less than the data amount of the input image signal IIMG.

The image signal processor 120 may image-process the first image signal IMG1 to generate a second image signal (S30). For example, the first image signal IMG1 may be image-processed by the image processing engine 122 including a plurality of image processing modules.

The image signal processor 120 may generate the third image signal IMG3 by upscaling the second image signal IMG2 (S40). For example, by upscaling, the resolution of the third image signal IMG3 may be greater than the resolution of the second image signal IMG2 and may be the same as the resolution of the input image signal IIMG.

The image signal processor 120 may generate the fourth image signal IMG4 by upscaling the first image signal IMG1 (S50). For example, by upscaling, the resolution of the input image signal IIMG and the resolution of the fourth image signal IMG4 may be the same.

The image signal processor 120 may generate an image information signal IMG_IF by extracting information on image quality deterioration of the third image signal IMG3 from the input image signal IIMG (S60). For example, for the fourth image signal IMG4 and the input image signal IIMG, by performing at least one of brightness enhancement, sharp enhancement, adaptive filtering, and noise reduction filtering, the image information signal IMG_IF may be generated by extracting information on image quality degradation of the third image signal IMG3. The generating of the image information signal IMG_IF by extracting the information on the image quality deterioration of the third image signal IMG3 is not limited to the above processes, and may include a plurality of different processing operations for extracting image information related to image quality degradation occurring for various reasons in the scaling and image processing operations. In addition, the image information signal IMG_IF may include a high-frequency component of the raw image for correcting image quality deterioration caused by scaling and/or image processing.

The image signal processor 120 may generate the output image signal OIMG by reconstructing the third image signal IMG3 and the image information signal IMG_IF (S70). For example, the generating of the output image signal OIMG may include performing at least one of radial correction and gain control processing on the image information signal IMG_IF.

Through the above series of operations, various image processing may be performed by minimizing power consumption, data band-width, and image quality degradation.

Figure 13:
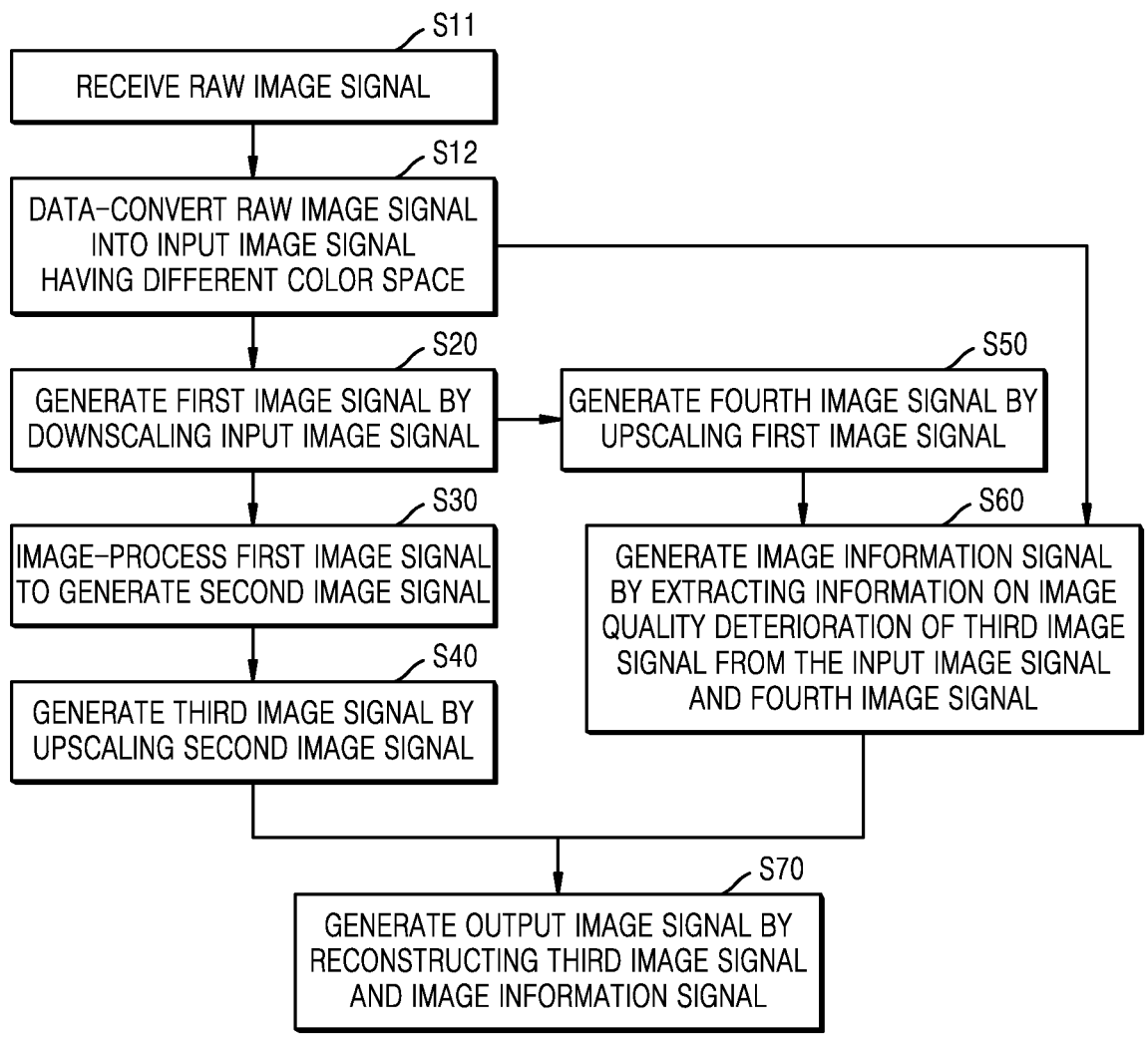
FIG. 13 is a flowchart illustrating an operating method of an image signal processor according to an example embodiment.

FIG. 13 is a flowchart illustrating a method of operating an image signal processor according to an example embodiment.

Referring to FIG. 13, the image signal processor 120 of FIG. 1 may receive a raw image signal RIMG (S11). For example, the image sensor 110 of FIG. 1 may generate a raw image signal RIMG, and the raw image signal RIMG may be input to the image signal processor 120.

The image signal processor 120 may convert the raw image signal RIMG into an input image signal IIMG having a color space different from that of the raw image signal RIMG (S12). For example, the input image signal IIMG generated by the transformation may have a larger amount of data than the raw image signal RIMG. In addition, the raw image signal RIMG may be a Bayer pattern, and the input image signal IIMG may be an RGB or YUV pattern.

The image signal processor 120 may generate the first image signal IMG1 by downscaling the input image signal IIMG (S20). For example, as a result of downscaling the input image signal IIMG, the data amount of the first image signal IMG1 may be less than the data amount of the input image signal IIMG.

The image signal processor 120 may image-process the first image signal IMG1 to generate a second image signal (S30). For example, the first image signal IMG1 may be image-processed by the image processing engine 122 including a plurality of image processing modules.

The image signal processor 120 may generate the third image signal IMG3 by upscaling the second image signal IMG2 (S40). For example, by upscaling, the resolution of the third image signal IMG3 may be greater than the resolution of the second image signal IMG2 and may be the same as the resolution of the input image signal IIMG.

The image signal processor 120 may generate the fourth image signal IMG4 by upscaling the first image signal IMG1 (S50). For example, by upscaling, the resolution of the input image signal IIMG and the resolution of the fourth image signal IMG4 may be the same.

The image signal processor 120 may generate an image information signal IMG_IF by extracting information on image quality deterioration of the third image signal IMG3 from the fourth image signal IMG4 and the input image signal IIMG (S60). For example, for the fourth image signal IMG4 and the input image signal IIMG, by performing at least one of brightness enhancement, sharp enhancement, adaptive filtering, and noise reduction filtering, the image information signal IMG_IF may be generated by extracting information on image quality degradation of the third image signal IMG3. The generating of the image information signal IMG_IF by extracting the information on the image quality deterioration of the third image signal IMG3 is not limited to the above processes, and may include a plurality of different processing steps for extracting image information related to image quality degradation occurring for various reasons in the scaling and image processing steps in the image processing process. In addition, the image information signal IMG_IF may include a high-frequency component of the raw image for correcting image quality deterioration caused by scaling and/or image processing.

The image signal processor 120 may generate the output image signal OIMG by reconstructing the third image signal IMG3 and the image information signal IMG_IF (S70). For example, the generating of the output image signal OIMG may include processing at least one of radial correction and gain control processing on the image information signal IMG_IF.

Through the above series of operations, various image processing may be performed by minimizing power consumption, data band-width, and image quality degradation.

Figure 14:
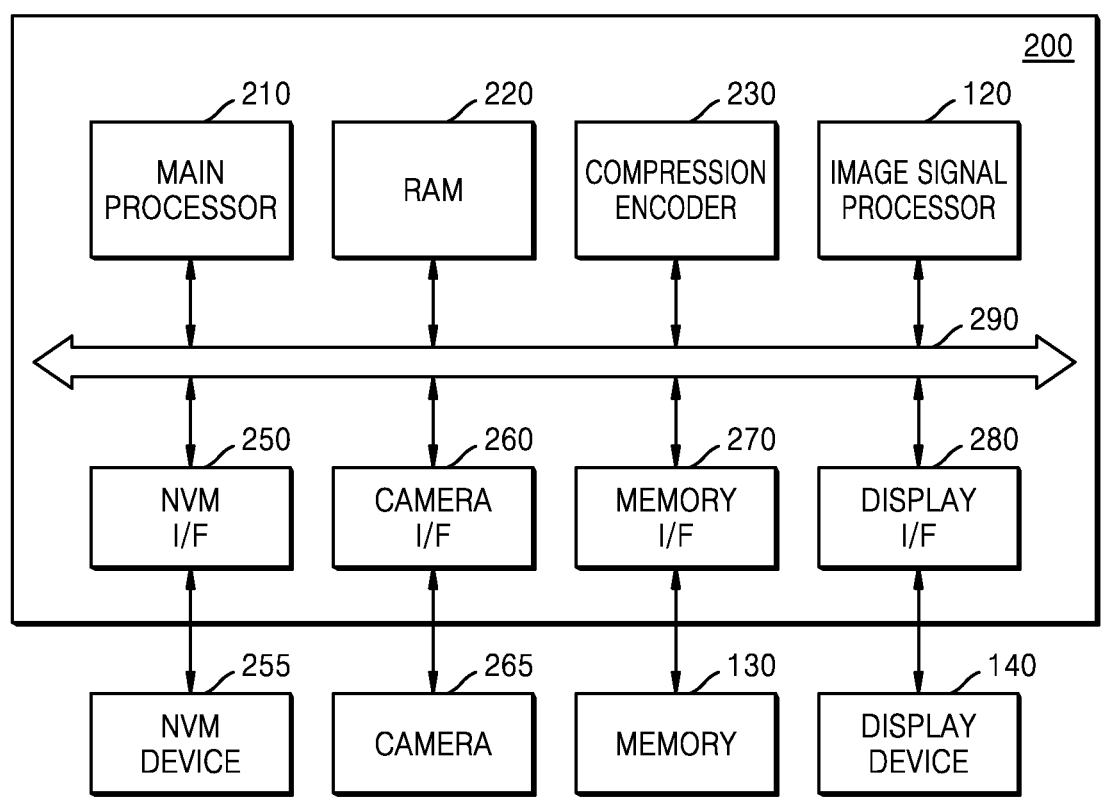
FIG. 14 is a block diagram illustrating an application processor according to an example embodiment.

FIG. 14 is a block diagram illustrating an application processor according to an example embodiment.

Referring to FIG. 14, the application processor 200 may include a main processor 210, a random access memory (RAM) 220, a compression encoder 230, an image signal processor 120, a non-volatile memory interface 250, a camera interface 260, a memory interface 270, and a display interface 280. Each of the components 210, 220, 230, 120, 250, 260, 270, and 280 of the application processor 200 may transmit and receive data to and from each other through a bus 290.

The main processor 210 may control the overall operation of the application processor 200. The main processor 210 may be implemented as, for example, a CPU, a microprocessor, and the like, and according to an example embodiment, the main processor 210 may be implemented as one computing component having two or more independent processors (or cores), that is, a multi-core processor. The main processor 210 may process or execute programs and/or data stored in the RAM 220 (or ROM).

The RAM 220 may temporarily store programs, data, and/or instructions. According to an example embodiment, the RAM 220 may be implemented as a dynamic RAM (DRAM) or a static RAM (SRAM). The RAM 220 may be input/output through the interfaces 250, 260, 270, and 280, or may temporarily store an image generated by the image signal processor 120 or the main processor 210.

In an example embodiment, the application processor 200 may further include a read only memory (ROM). The ROM may store continuously used programs and/or data. The ROM may be implemented as an erasable programmable ROM (EPROM) or an electrically erasable programmable ROM (EEPROM).

The non-volatile memory interface 250 may interface data input from the non-volatile memory device 255 or data output to the non-volatile memory. The non-volatile memory device 255 may be implemented as, for example, a memory card (e.g., MMC, eMMC, SD, and micro SD).

The camera interface 260 may interface data (e.g., a raw image signal RIMG or an input image signal IIMG) input from the camera 265 located outside the application processor 200. The camera 265 may generate data for an image captured by using a plurality of light sensing elements. The raw image signal RIMG received through the camera interface 260 may be provided to the image signal processor 120 or stored in the memory 130 through the memory interface 270.

The memory interface 270 may interface data input from the memory 130 external to the application processor 200 or data output to the memory 130. According to an example embodiment, the memory 130 may be implemented as a volatile memory such as DRAM or SRAM or a non-volatile memory such as ReRAM, PRAM or NAND flash.

The display interface 280 may interface data (e.g., an output image signal OIMG) output to the display device 140. The display device 140 may output image data through a display such as a liquid-crystal display (LCD) or active matrix organic light emitting diode (AMOLED).

The compression encoder 230 may encode an image to output an encoded image, that is, a compressed image. The compression encoder 230 may encode the converted image output from the image signal processor 120 or the converted image stored in the memory 130. In an example embodiment, the compression encoder 230 may be a JPEG module, and the JPEG module may output a JPEG format image. The JPEG format image may be stored in the non-volatile memory device 255.

As performing image processing on an image, for example, a raw image signal RIMG or an input image signal IIMG, provided from a camera (or image sensor 110) to generate an image-processed image signal, the image signal processor 120 may store the image-processed image in the memory 130, or scale the converted image to provide the scaled image to the display device 140.

Figure 15:
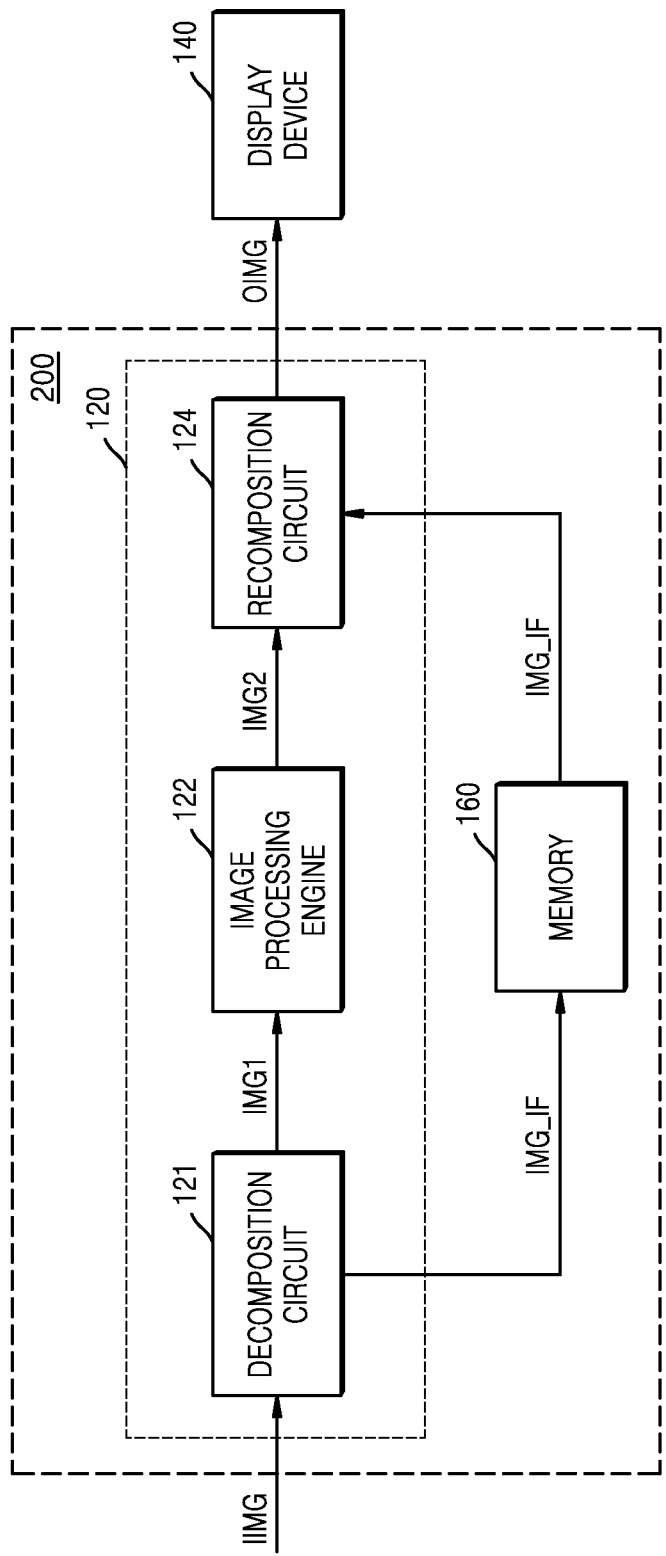
FIG. 15 is a block diagram illustrating an image signal processor and a memory of an application processor according to an example embodiment.

FIG. 15 is a block diagram illustrating an image signal processor and a memory of an application processor according to an example embodiment.

The application processor 200 may include an image signal processor 120 and a memory 160. The image signal processor 120 may include a decomposition circuit 121, an image processing engine 122, and a recomposition circuit 124.

The image information signal IMG_IF generated by the decomposition circuit 121 included in the image signal processor 120 may be stored in the memory 160 located outside the image signal processor 120, and may be transmitted to the recomposition circuit 124 according to the timing at which the second image signal IMG2 is input to the recomposition circuit 124.

For example, the memory 160 may be a volatile memory such as a dynamic random access memory (DRAM) or a static RAM (SRAM), or a non-volatile memory such as a phase change RAM (PRAM), a resistive RAM (ReRAM), or a flash memory.

Figure 16:
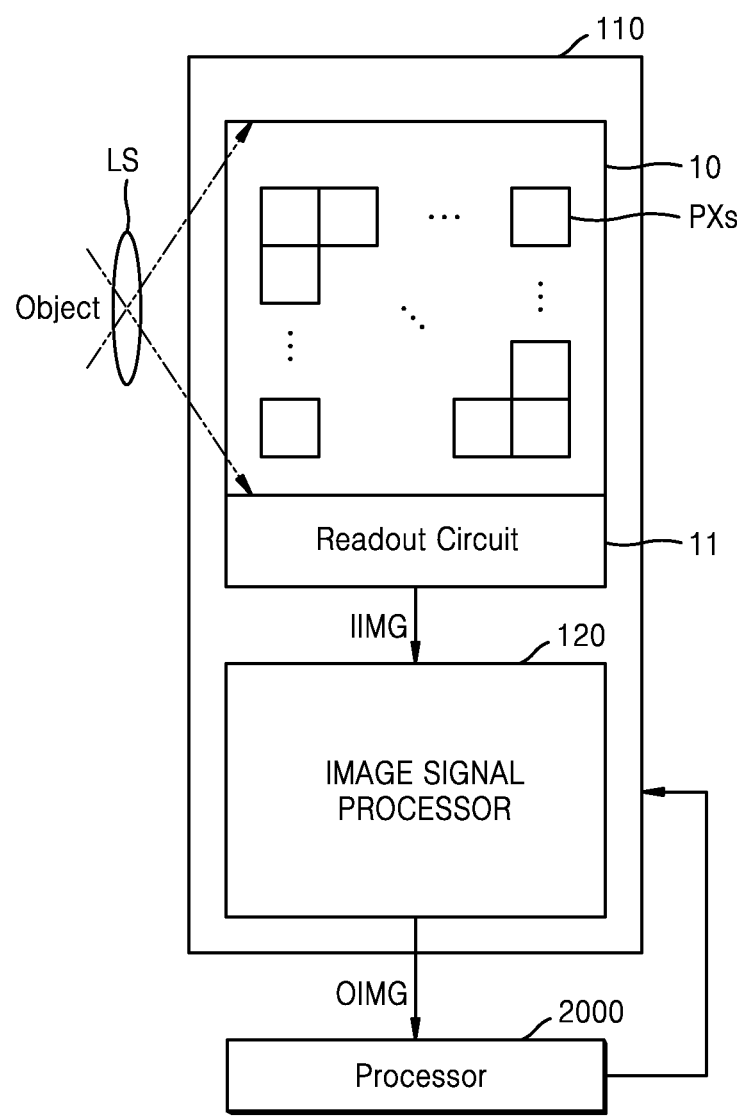
FIG. 16 is a block diagram illustrating an image sensor including an image signal processor according to an example embodiment.

FIG. 16 is a block diagram illustrating an image sensor including an image signal processor according to an example embodiment.

The image sensor 110 may convert an optical signal of an object incident through the optical lens LS into image data. The image sensor 110 may be mounted on an electronic device having an image or light sensing function. For example, the image sensor 110 may be mounted on the electronic device such as digital still cameras, digital video cameras, smartphones, wearable devices, Internet of Things (IoT) devices, tablet Personal Computers (PCs), Personal Digital Assistants (PDAs), Portable Multimedia Players (PMPs), navigation devices, and the like. In addition, the image sensor 110 may be mounted on an electronic device provided as a component for vehicles, furniture, manufacturing facilities, doors, various measuring devices, and the like.

Referring to FIG. 16, the image sensor 110 may include a pixel array 10, a readout circuit 11, and an image signal processor 120. In an example embodiment, the pixel array 10, the readout circuit 11, and the image signal processor 120 may be implemented as a single semiconductor chip or semiconductor module. In an example embodiment, the pixel array 10 and the readout circuit 11 may be implemented as one semiconductor chip, and the image signal processor 120 may be implemented as another semiconductor chip.

The pixel array 10, for example, may be implemented with a photoelectric conversion element such as a Charge Coupled Device (CCD) or a Complementary Metal Oxide Semiconductor (CMOS), and may be implemented with various types of photoelectric conversion devices. The pixel array 10 includes a plurality of sensing pixels PXs that convert a received optical signal (light) into an electrical signal, and the plurality of sensing pixels PXs may be arranged in a matrix. Each of the plurality of sensing pixels PXs includes a light sensing element. For example, the light sensing element may include a photo diode, an organic photo diode, a photo transistor, a port gate, or a pinned photo diode.

The readout circuit 11 may convert electrical signals received from the pixel array 10 into image data. The readout circuit 11 may amplify electrical signals and analog-digitize the amplified electrical signals. The image data generated by the readout circuit 11 may include a plurality of pixels corresponding to the plurality of sensing pixels PXs of the pixel array 10. Here, the sensing pixels PXs of the pixel array 10 are physical structures that generate a signal according to the received light, and the pixels included in the image data represent data corresponding to the sensing pixels PXs. The readout circuit 11 may constitute a sensing core together with the pixel array 10.

The data conversion unit 150 of FIG. 7 may be added between the readout circuit 11 and the image signal processor 120. The data conversion unit 150 may convert the raw image signal RIMG output from the readout circuit 11 into an input image signal IIMG having the same resolution as the raw image signal RIMG and having a larger amount of data. Alternatively, the data conversion unit 150 may convert the raw image signal RIMG into an input image signal IIMG having a different color space. For example, the raw image signal RIMG may have a Bayer pattern, and the input image signal IIMG may have an RGB or YUV pattern.

The image signal processor 120 may perform image processing on image data output from the readout circuit 11, that is, raw image data. For example, the image signal processor 120 may perform image processing such as bad pixel correction, remosaic, and noise removal on the image data.

To minimize image quality deterioration due to scaling and image processing that may occur during the image processing process, the image signal processor 120 may include a decomposition circuit 121, an image processing engine 122, and a recomposition circuit 124 as shown in FIG. 2. The decomposition circuit 121 may include a downscaling circuit 125, a second upscaling circuit 126, and a correction information generating circuit 127 as shown in FIG. 7. The correction information generating circuit 127 may generate an image information signal IMG_IF including information capable of correcting image quality deterioration. The recomposition circuit 124 may generate an output image signal OIMG with reduced image quality by reconstructing the third image signal IMG3 whose image quality is lower than that of the input image signal IIMG through the image information signal IMG_IF.

Figure 17:
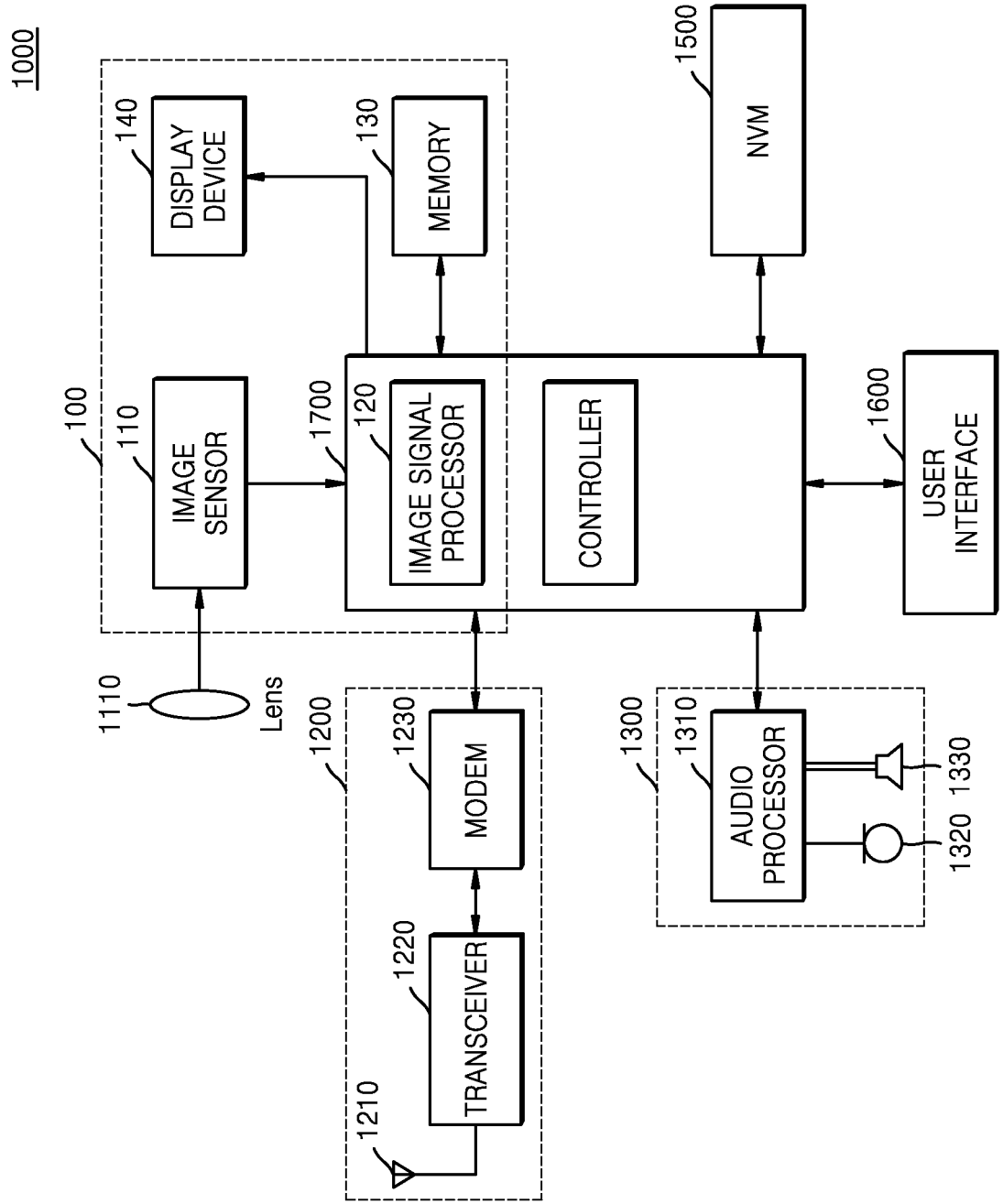
FIG. 17 is a block diagram illustrating a portable terminal including an image signal processor according to an example embodiment.

FIG. 17 is a block diagram illustrating a portable terminal including an image signal processor according to an example embodiment.

Referring to FIG. 16, the portable terminal 1000 according to the example embodiment may include an image processing system 100, a wireless transmission/reception unit 1200, an audio processing unit 1300, a non-volatile memory device 1500, a user interface 1600, and a controller 1700.

The image processing system 100 may include a lens 1110, an image sensor 110, a display device 140, a memory 130, and an image signal processor 120. As shown in the example embodiment, the image signal processor 120 may be implemented as a part of the controller 1700.

The image signal processor 120 may generate a converted image by performing image processing on an image provided from the image sensor 110, for example, an input image signal IIMG (or a raw image signal RIMG), and in this case, minimize power consumption, data band width, and deterioration of image quality in the image processing process according to embodiments of the disclosure. In addition, the converted image according to the image processing of embodiments of the disclosure may be stored in the memory 130, or the converted image may be scaled to provide the scaled image to the display device 140.

The wireless transmission/reception unit 1200 includes an antenna 1210, a transceiver 1220, and a modem 1230. The audio processing unit 1300 may include an audio processor 1310, a microphone 1320, and a speaker 1330. The non-volatile memory device 1500 may be provided as a memory card (e.g., MMC, eMMC, SD, and micro SD) or the like.

The user interface 1600 may be implemented with various devices capable of receiving user input, such as a keyboard, a curtain key panel, a touch panel, a fingerprint sensor, and a microphone. The user interface 1600 may receive a user input and provide a signal corresponding to the received user input to the controller 1700.

The controller 1700 may control the overall operation of the portable terminal 1000 and may be provided as a system-on-chip (SoC) that drives an application program, an operating system, and the like. A kernel of an operating system driven in the SoC may include an I/O scheduler and a device driver for controlling the nonvolatile memory device 1500.

While example embodiments of the disclosure been particularly shown and described, it will be understood that various changes in form and details may be made therein without departing from the spirit and scope of the following claims.

What is claimed is:

1. An image signal processor comprising:
    a downscaling circuit configured to generate a first image signal by downscaling an input image signal;
    an image processing engine configured to generate a second image signal by performing a plurality of image processing operations on the first image signal;
    a first upscaling circuit configured to generate a third image signal by upscaling the second image signal;
    a second upscaling circuit configured to generate a fourth image signal by upscaling the first image signal;
    a correction information generating circuit configured to generate an image information signal by extracting information on image quality loss of the third image signal from the input image signal and the fourth image signal; and
    a recomposition circuit configured to generate an output image signal by recomposing the third image signal and the image information signal.

2. The image signal processor of claim 1, wherein the correction information generating circuit comprises at least one brightness enhancement circuit configured to perform brightness enhancement on the input image signal and the fourth image signal.

3. The image signal processor of claim 1, wherein the correction information generating circuit comprises at least one of an adaptive filter, a noise reduction filter, a brightness enhancement circuit corresponding to image processing by the image processing engine, and a sharpness enhancement circuit.

4. The image signal processor of claim 1, wherein the correction information generating circuit comprises a differential circuit configured to differentiate the input image signal and the fourth image signal.

5. The image signal processor of claim 1, wherein the recomposition circuit comprises at least one of a radial correction circuit configured to correct the image information signal, and a gain control circuit configured to perform gain control on the image information signal.

6. The image signal processor of claim 1, wherein the downscaling circuit is further configured to downscale the input image signal by blocking a high-frequency band signal of the input image signal.

7. The image signal processor of claim 1, further comprising a data conversion unit configured to generate the input image signal having a color space different from a color space of a raw image signal provided from an image sensor.

8. The image signal processor of claim 7, wherein a resolution of the input image signal converted by the data conversion unit is same as a resolution of the raw image signal, and a data amount of the input image signal is greater than a data amount of the raw image signal.

9. The image signal processor of claim 7, wherein the raw image signal has a Bayer pattern, and the input image signal has an RGB or YUV pattern.

10. The image signal processor of claim 1, wherein the image information signal comprises information indicating a high-frequency component of the input image signal.

11. The image signal processor of claim 1, further comprising a memory configured to store the image information signal and provide the image information signal to the recomposition circuit.

12. An operating method of an image signal processor configured to image process an input image signal, the operating method comprising:
- generating a first image signal by downscaling the input image signal;
- generating a second image signal by image processing the first image signal;
- generating a third image signal by upscaling the second image signal;
- generating a fourth image signal by upscaling the first image signal;
- generating an image information signal by extracting information on image quality loss of the third image signal from the input image signal and the fourth image signal; and
- generating an output image signal by recomposing the third image signal and the image information signal.

13. The operating method of claim 12, wherein the generating of the image information signal comprises performing at least one of brightness enhancement, adaptive filtering, sharpness enhancement, and noise reduction on the input image signal and the fourth image signal.

14. The operating method of claim 12, wherein the generating of the image information signal further comprises differentiating the fourth image signal and the input image signal.

15. The operating method of claim 12, wherein the generating of the output image signal comprises performing at least one function of radial correction and gain control on the image information signal and then reconstructing a result of the image information signal with the third image signal to generate the output image signal.

16. The operating method of claim 12, further comprising performing a data conversion operation for converting a raw image signal provided from an image sensor into the input image signal having a color space different from the raw image signal.

17. The operating method of claim 16, wherein, in the converting of the raw image signal into the input image signal, a resolution of the input image signal is same as a resolution of the raw image signal, and a data amount of the input image signal is converted to be greater than a data amount of the raw image signal.

18. The operating method of claim 12, wherein the generating of the output image signal comprises:
- storing the image information signal in a memory;
- outputting the image information signal by the memory; and
- generating the output image signal by reconstructing the image information signal and a third image signal output from the memory.

19. An application processor comprising:
- a decomposition circuit configured to generate a first image signal including a low-frequency component of an input image signal and an image information signal including a high-frequency signal, based on the input image signal;
- an image processing engine configured to generate a second image signal by performing a plurality of image processing operations on the first image signal;
- an image signal processor including a recomposition circuit configured to recompose the second image signal and the image information signal to generate an output image signal; and
- a memory configured to store the image information signal and transmit the image information signal to the recomposition circuit.

20. The application processor of claim 19, wherein the decomposition circuit comprises:
- a downscaling circuit configured to generate the first image signal by downscaling the input image signal;
- a second upscaling circuit configured to upscale the first image signal to generate a fourth image signal; and
- a correction information generating circuit configured to generate the image information signal by extracting information on image quality loss of the second image signal from the input image signal and the fourth image signal.

* * * * *